May 18, 1965 B. B. GIRDEN 3,183,530
SWIMMER'S SAFETY BUOY AND FLOAT
Filed Dec. 17, 1963 3 Sheets-Sheet 1

INVENTOR.
BARNEY B. GIRDEN
BY
ATTORNEY

May 18, 1965 B. B. GIRDEN 3,183,530
SWIMMER'S SAFETY BUOY AND FLOAT
Filed Dec. 17, 1963 3 Sheets-Sheet 2
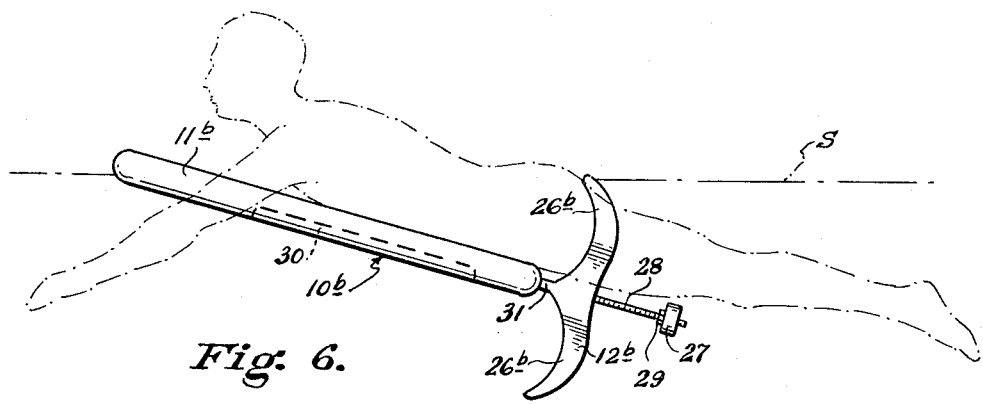
Fig. 6.
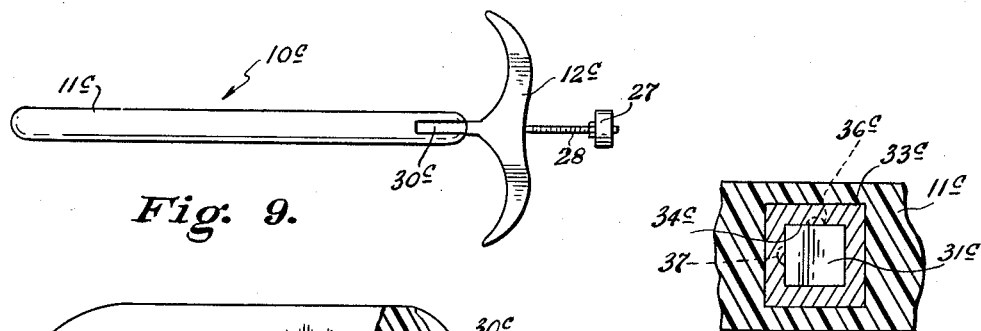
Fig. 9.
Fig. 12.
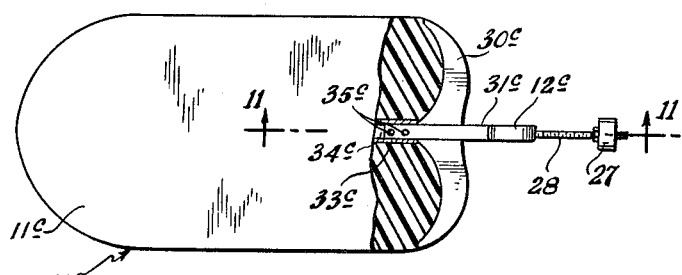
Fig. 10.
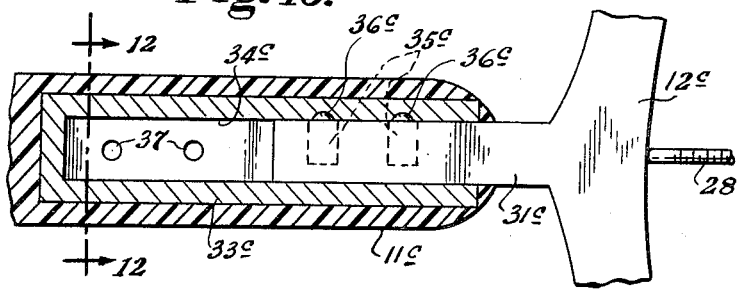
Fig. 11.
INVENTOR.
BARNEY B. GIRDEN
BY
ATTORNEY.

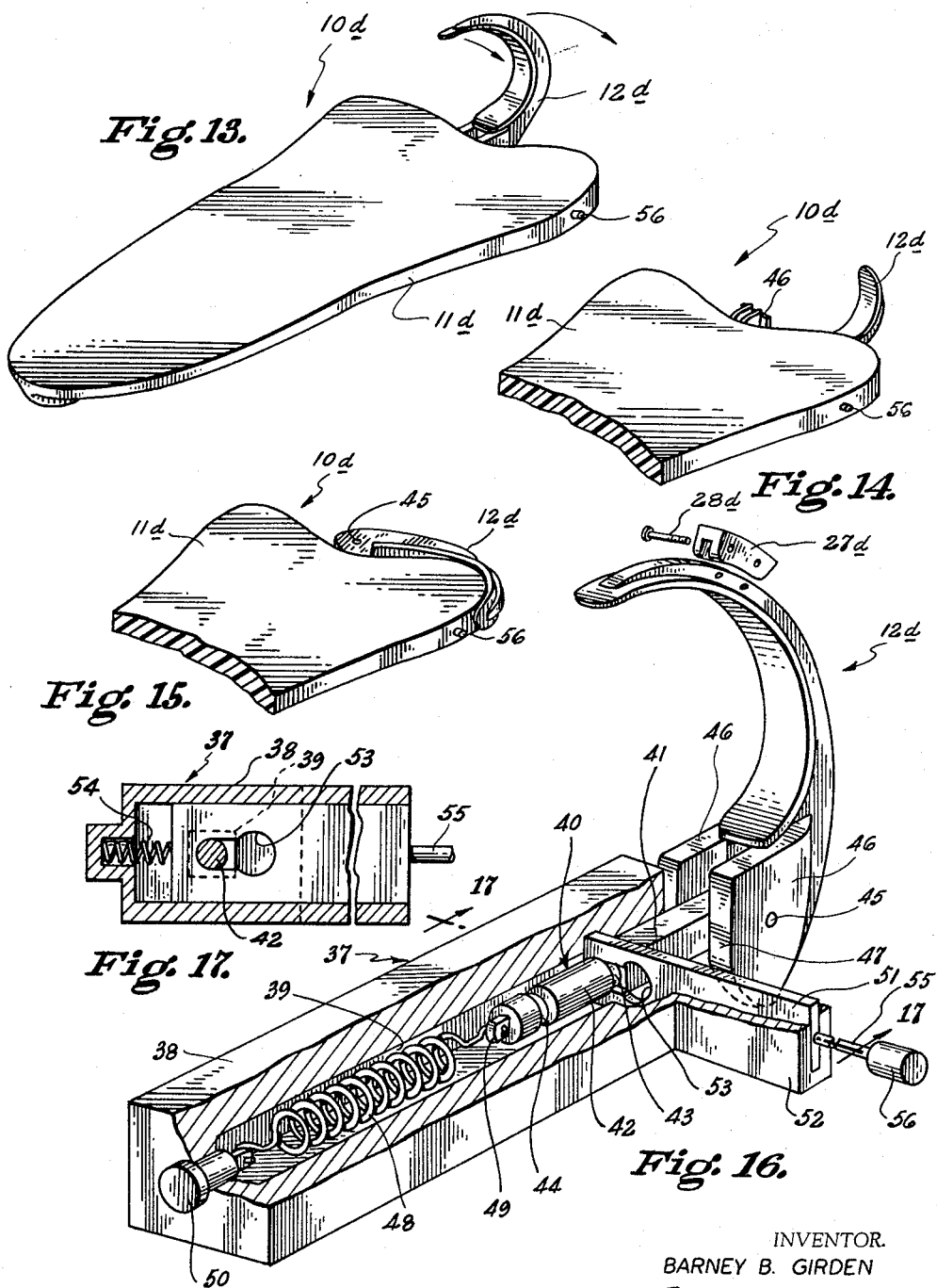

3,183,530
SWIMMER'S SAFETY BUOY AND FLOAT
Barney B. Girden, 36 W. 76th St., New York 23, N.Y.
Filed Dec. 17, 1963, Ser. No. 332,336
20 Claims. (Cl. 9—311)

This invention relates generally to improvements in safety buoys and floats for swimmers, and the present application is a continuation-in-part of my co-pending application Serial No. 272,418, filed April 11, 1963, and now abandoned.

The development and promotion of underwater masks, snorkels, fins and underwater cameras and guns, have prompted increasing numbers of swimmers to engage in sub-surface swimming or skin-diving for the purposes of exploring and photographing submarine life, spear fishing, salvage operations, and the like. Many of these swimmers lack sufficient aquatic training and thus are constantly subject to the dangers of currents, undertows, rocks, surf conditions and the like, and further lack the ability to properly judge their stamina in the water. Accordingly, upon surfacing after a dive, these relatively inexperienced swimmers or skin-divers frequently suffer from fatigue and, burdened as they are with cumbersome and heavy equipment, they encounter difficulty in returning to shore or boat from which the dive originated, and which may be at a considerable distance from the swimmer when the latter resurfaces.

Accordingly, it is an object of this invention to provide a float of substantial buoyancy which may have a reel as a part thereof for automatically rewinding a line suitably connected to a swimmer so that, upon the return of the swimmer to the surface, the float will then be within easy reach of the swimmer for use by the latter in buoyantly supporting himself on the surface, and wherein the float is constructed and arranged so that it can buoyantly support the swimmer while avoiding any interference with the arm or leg movements of the latter such as those required for the performance of the crawl or other usual swimming stroke, thereby to conveniently permit the swimmer to return to a boat or shore even from a relatively great distance.

Concurrently with the above mentioned increase in the number of persons engaging in underwater swimming activities, there has been a tremendous increase in motor boating and in water skiing, with the latter activities frequently occurring in the same waters used by underwater swimmers. Since underwater swimmers are not at all visible, and even swimmers lying low on the surface are not readily visible, to the pilot of a motor boat, particularly in congested waters, such surface swimmers and skin divers returning to the surface have been frequently run over by motor boats or by water skiers towed by motor boats, with resulting serious and often fatal injuries to the swimmers. Although various floats and other devices have been proposed for the purpose of warning the pilots of motor boats of the proximity or presence of a swimmer, these existing devices, for example, as disclosed in United States Letters Patent No. 2,974,331, issued March 14, 1961, to M. W. Dize, are usually in the form of floats lying low in the water and even when provided with a flag or pennant, they do not provide an adequately visible warning against the encroachment of motorboats and other surface craft. Further, these existing floats are relatively expensive and cumbersome and, in the cases where the same are intended to buoyantly support the swimmer following a dive, such floats do not permit the swimmer to use a conventional swimming stroke in returning to shore or to a boat from which a dive originated.

Accordingly, it is another object of this invention to provide a float which, when mounted by a swimmer, buoyantly supports the latter while completely freeing the swimmer's arms and legs, for example, for the movements required by the crawl or other conventional swimming stroke, and which, when released by the swimmer, assumes a substantially erect position in the water with the major part of the float being exposed above the surface of the water so as to constitute a marker or buoy that, by reason of its size and the extent to which it projects above the surface, is clearly visible to the pilots of motorboats for warning the latter from the vicinity.

In accordance with an aspect of this invention, a swimmer's float comprises a generally flat, light-weight buoyant member, preferably of an expanded or foamed plastic material, for example, polyethylene or polystyrene foam, and being of relatively large area, with the length of the buoyant member being preferably larger than the width thereof, and a saddle member extending centrally from the back end of the float member and being adapted to be positioned in a plane which is perpendicular to the major plane of the float member, such saddle member, when thus positioned, defining at least one arcuate recess opening generally toward the buoyant member at a side of the plane of the latter so that a swimmer can straddle the saddle member, and the buoyant member will thereby be held in engagement with the swimmer's body while completely freeing the swimmer's arms and legs, for example, to permit the normal movements required in the crawl or other conventional swimming strokes. Further, there may be provided a weight or other means of relatively high specific gravity, which may be constituted by the saddle member itself, having its center of gravity spaced rearwardly from the buoyant member so that, when the float is released by the swimmer, the buoyant member assumes a vertical or erect position with substantially the entire area of the buoyant member being exposed above the surface of the water by reason of the extremely high buoyancy of the foamed plastic material of which the buoyant member is preferably formed, thereby to also constitute a readily visible safety buoy.

In various embodiments of the invention, the saddle member may be mounted from only one side of the buoyant member in the erect position of the latter or, alternatively, the saddle member may be formed with portions defining arcuate recesses opening at the opposite sides of the plane of the buoyant member, in the erect position of the latter, so that the saddle member may be mounted or straddled by a swimmer from either side of the buoyant member. Further, the saddle member may be securely attached or fixed with respect to the buoyant member, or the saddle member may be made detachable from or stowable in the buoyant member in order to facilitate transport of the safety buoy and float.

Still another object is to provide a swimmer's float having a buoyant member with a saddle member extending from the back end thereof, as previously mentioned, and wherein the saddle member is easily movable from its operative position to facilitate mounting of the buoyant member by a swimmer, and thereafter is returnable to its operative position for maintaining engagement of the buoyant member wth the swimmer's body.

In a particularly advantageous embodiment of the invention, the attachment of the saddle member at the back end of the buoyant member permits selective positioning of the saddle member at its operative position, at a mounting position swung approximately 90 degrees rearwardly and downardly from the operative position, and at a stowed position lying in a plane parallel to the major plane of the buoyant member and close against the back end of the latter.

The above, and other objects, features and advantages of the invention, will be apparent in the following detailed description of illustrative embodiments thereof which is to be read in connection with the accompanying drawings forming a part hereof, and wherein:

FIG. 6 is a view similar to that of FIG. 1, but showing a safety buoy and float constructed in accordance with still another embodiment of this invention, and particularly having a relatively larger buoyant member;

FIG. 9 is a side elevational view of a swimmer's safety buoy and float in accordance with still another embodiment of the invention;

FIG. 10 is a top plan view, partly broken away and in section, of the device of FIG. 9;

FIG. 11 is an enlarged sectional view taken along the line 11—11 on FIG. 10;

FIG. 12 is a sectional view taken along the line 12—12 on FIG. 11;

FIG. 13 is a perspective view of a swimmer's float constructed in accordance with still another embodiment of the invention, and shown with its saddle member in the operative position thereof;

FIG. 14 is a fragmentary perspective view of the swimmer's float of FIG. 13, but with its saddle member in the position for easy mounting by a swimmer;

FIG. 15 is a view similar to that of FIG. 14, but showing the saddle member in its stowed position;

FIG. 16 is an enlarged perspective view, partly broken away and in section, of the mechanism attaching the saddle member to the buoyant member in the swimmer's float of FIGS. 13, 14 and 15; and FIG. 17 is a detail sectional view taken along the line 17—17 on FIG. 16.

Figure 1:
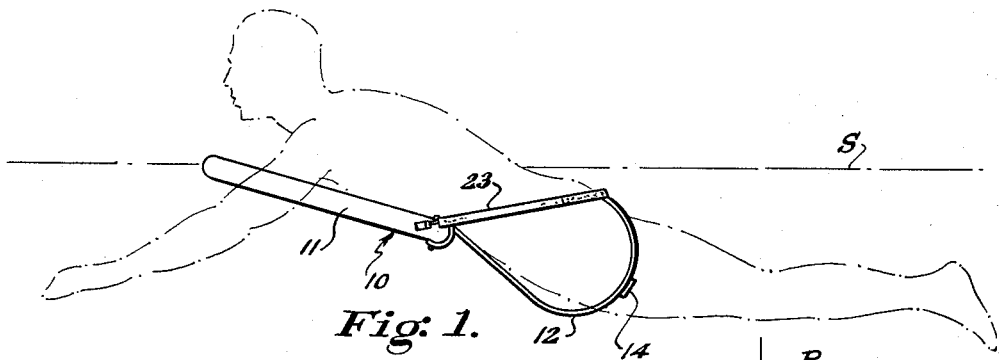
FIG. 1 is a side elevational view of a safety buoy or float embodying the present invention, with such device being shown in its position for buoyantly supporting a swimmer who is represented in broken lines.
Figure 2:
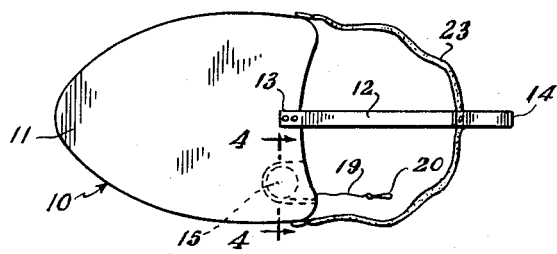
FIG. 2 is a top plan view of the safety buoy or float of FIG. 1.
Figure 3:
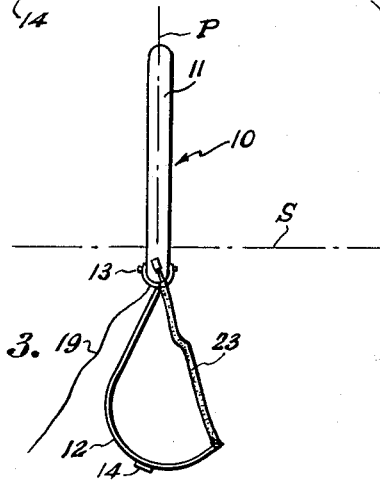
FIG. 3 is a side elevational view similar to that of FIG. 1, but showing the safety buoy and float in an erect position which it may automatically assume when released by the swimmer.

Referring to the drawings in detail, and initially to FIGS. 1, 2 and 3 thereof, it will be seen that a swimmer's safety buoy and float in accordance with this invention, and there generally identified by the reference numeral 10, substantially comprises a buoyant member 11 and a saddle member 12. The buoyant member 11 is substantially flat and of relatively large surface area in relation to its thickness, for example, as is the case when the buoyant member 11 has the configuration of a kickboard or surfboard, as shown. The buoyant member 11 is fabricated of a light material of great buoyancy, preferably, of a foamed or expanded plastic material, such as, polystyrene, polyethylene or the like. The forward end of the buoyant member 11 may have the form of a blunted point, as shown on FIG. 2, or it may have any other configuration which, according to hydrodynamic design principles, will reduce the resistance to forward travel of the buoyant member 11 through the water when the latter lies substantially flat in the water, as in FIG. 1.

The saddle member 12 extends rearwardly from the center of the back end of buoyant member 11 to which it is attached, for example, by screws or rivets 13 (FIG. 2). The saddle member 12 may be formed of a length of relatively dense, non-buoyant material, for example, of metal or of a rigid plastic, and has an arcuate configuration (FIGS. 1 and 3) lying in a plane substantially at right angles to the plane of the flat buoyant member 11 so as to define an arcuate recess opening generally toward the buoyant member of one side of the latter.

Since the buoyant member 11 is of very little weight and extremely buoyant, when the saddle member 12 extending from the back end of buoyant member 11 is of relatively dense or heavy material, the saddle member 12 will tend to hold the buoyant member 11 erect in the water with most of the area of the buoyant member being exposed above the surface S of the water, as shown on FIG. 3. However, if desired, the saddle member 12 may be further weighted, as at 14, thereby to increase the stability of the buoyant member 11 in its erect position. Further, when the saddle member 12 has a hooked or arcuate configuration to define a recess opening only at one side of the buoyant member 11, as in the embodiment of FIGS. 1, 2 and 3, such saddle member is preferably formed so that its center of gravity lies in the central plane of buoyant member 11 lying parallel to the large surfaces of the latter, as indicated by the broken line P on FIG. 3, thereby ensuring that the plane P will extend vertically in the illustrated erect position of the buoyant member.

It will be apparent that, by reason of the relatively large surface areas of the buoyant member 11, which surfaces are preferably coated with luminous paint, the arrangement of the float 10, as described above, so that the buoyant member 11 automatically floats in an erect position with substantially its entire surfaces of large area exposed above the surface S of the water when released by a swimmer, causes such buoyant member to constitute a highly visible buoy capable of reliably warning motor boats or other craft of the presence of a swimmer in the vicinity.

In order to ensure that an underwater swimmer using the safety buoy and float 10 will always return to the surface near the latter, thereby to be afforded the protection of the warning signal constituted by the safety buoy and further to have the latter immediately on hand or within reach for providing buoyant support to the swimmer who may be suffering from fatigue, the safety buoy and float 10 preferably also include an automatically rewinding reel device 15. As shown on FIG. 4, the reel device 15 may include a housing 16 received in a pocket 17 formed in the back end portion of buoyant member 11, a reel 18 rotatably mounted in housing 16, a line 19 of suitable length wound on reel 18 and extending from buoyant member 11 with a spring hook or other clasp 20 (FIG. 2) connected to the free end of line 19 for attachment to a belt worn by the swimmer, and reduction gearing 21 connected between the reel 18 and a spiral spring 22 so that, as line 19 is withdrawn from reel 18 in response to diving of the swimmer away from the safety buoy and float 10, the spring 22 is loaded or tightened and thereby causes the reverse rotation of the reel 18 for rewinding the line 19 thereon as the swimmer returns to the surface.

Upon returning to the surface, the swimmer mounts the safety buoy and float 10 merely by straddling the saddle member 12 which is conveniently submerged well below the surface S, as shown in FIG. 3, and the swimmer then merely leans forwardly against buoyant member 11 to lay the latter down in the water with the swimmer then being in a prone position for performing the crawl or other usual swimming stroke. When the buoyant member 11 thus supports the swimmer in a prone position, the buoyant member 11 generally is slightly inclined upwardly toward its forward end, as shown on FIG. 1, so that the relatively great buoyancy of the member 11 results in a component acting in the forward direction and tending to make the buoyant member 11 move forwardly out from under the swimmer. Such tendency of the buoyant member 11 to move forwardly out from under the swimmer is similar to that encountered by the users of foamed or expanded plastic kickboards or surfboards, and which makes necessary the grasping of the latter devices by the swimmer. However, in the case of the safety buoy and float 10 embodying the present invention, the engagement of the saddle member 12 between the legs of the swimmer makes it impossible for the buoyant member 11 to move forwardly from under the swimmer and the forwardly directed component of the buoyant force merely serves to maintain the position of the saddle member 12 between the swimmer's legs. Thus, the arms, as well as the legs of the swimmer are completely free for any desired movement, for example, to perform the movements required in the crawl or other swimming stroke so that a fatigued swimmer may be buoyantly supported by the safety buoy and float 10 and yet not have his efficiency impaired in swimming toward a distant shore or boat.

Figure 4:
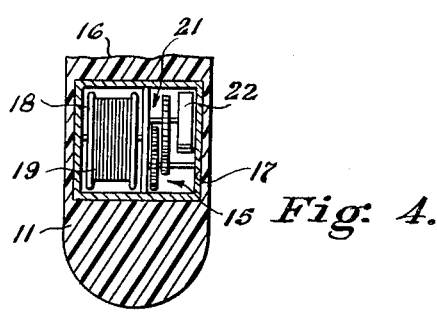
FIG. 4 is an enlarged, fragmentary sectional view taken along the line 4—4 on FIG. 2.

Although the effect of the forward component of the buoyant force is to maintain engagement of the saddle member 12 between the swimmer's legs, as described above, engagement of the safety buoy and float 10 with a swimmer may be further ensured, for example, as when conducting rescue operations therewith, by providing a strap 23 secured, at its center, to the free end of saddle member 12 and having snap hooks or the like at the ends of the strap 23 for engagement with rings suitably anchored to the opposite sides of buoyant member 11 at the back end of the latter, particularly as shown on FIG. 4. Thus, after engagement of the saddle member 12 between the swimmer's legs, the strap 23 may generally encircle the swimmer's waist and have its ends anchored to the back end of the buoyant member 11.

Figure 5:
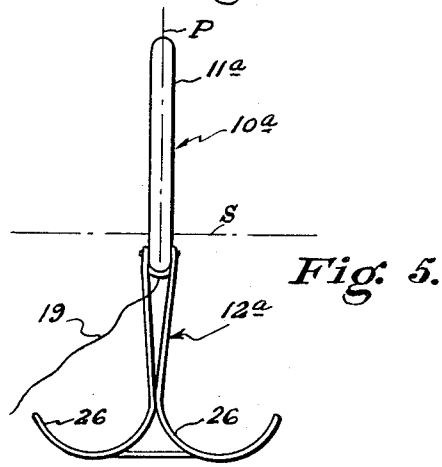
FIG. 5 is a view similar to that of FIG. 3, but showing another embodiment of this invention.

Although the safety buoy and float 10 described above has its saddle member 12 defining only one arcuate recess opening at only one side thereof so that such saddle member can only be mounted from the right-hand side of buoyant member 11, as viewed on FIG. 3, it is to be noted that a safety buoy and float embodying this invention may be provided with a saddle member defining two arcuate recesses opening at the opposite sides of the float or buoyant member in the erect position of the latter and thereby permitting mounting of the saddle member by a swimmer from either side of the buoyant member. More specifically, as shown on FIG. 5, a safety buoy and float 10a embodying the present invention and being generally similar to the previously described embodiment is provided with a saddle member 12a extending centrally from the back end of the buoyant member 11a and having a pair of oppositely curved arcuate portions 26 both lying in a common plane which is perpendicular to the plane of the relatively flat buoyant member 11a. The arcuate portions 26 define recesses opening generally toward buoyant member 11a at the opposite sides of the latter so that such portions 26 may be mounted or straddled by a swimmer from opposite sides of the buoyant member 11a when the latter is in its illustrated erect position. As in the case of the saddle member 12, the saddle member 12a has its center of gravity lying in the plane P of buoyant member 11a which is midway between the large surfaces of the latter so that the weight of the saddle member 12a which is non-buoyant will serve to maintain the buoyant member 11a in its erect position when the safety buoy and float is released by the swimmer.

In the previously described embodiments of the invention, the buoyant member 11 or 11a is relatively short, for example, is in the form of a conventional kickboard so that in order to position the buoyant member properly with respect to a swimmer when buoyantly supporting the latter, the saddle member 12 or 12a must extend a substantial distance rearwardly with respect to the back end of the buoyant member. By reason of the substantial rearward extension of the saddle member from the buoyant member, the weight of the saddle member, with or without the assistance of additional weighting means 14, is sufficient to urge the buoyant member 11 to the desired erect position when released by a swimmer. However, as shown on FIG. 6, a safety buoy and float 10b embodying this invention may have a buoyant member 11b of greater length than in the previously described embodiments, for example, in the form of a surfboard, in which case the proper positioning of the swimmer's body with respect to the buoyant member 11b requires that the saddle member 12b be disposed at or near the back end of the buoyant member. When the buoyant member is of substantial length and the saddle member is disposed at or near the back end of the long buoyant member, as on FIG. 6, the weight of the saddle member or of additional weighting means mounted directly thereon, may not be sufficient to maintain the buoyant member 11b in a vertical or erect position when released by the swimmer. In that case, the float 10b still affords the described advantage of supporting the swimmer while avoiding interference with arm or leg movements. However, if it is desired to have the buoyant member 11b assume a vertical position upon release by the swimmer, an additional weight 27 is then mounted on a member 28 extending from the saddle member 12b away from buoyant member 11b to ensure that the aggregate center of gravity of the saddle member, weight 27 and member 28 will be located well in back of the back end of the long buoyant member 11b.

As shown on the drawing, the member 28 may be in the form of a threaded rod, while the weight 27 has an internally threaded bore receiving the rod 28 for adjustment of the weight 27 along the latter, with a lock nut 29 being provided for holding the weight 27 in its adjusted position along threaded rod 28. Thus, the assembly of the saddle member 12b, the threaded rod 28 and the weight 27 may be standardized for use with buoyant members of different lengths or sizes, with the weight 27 being merely adjusted or differently positioned along rod 28 to provide the requisite force for holding the different buoyant members in the erect or vertical position upon release by a swimmer.

Figure 7:
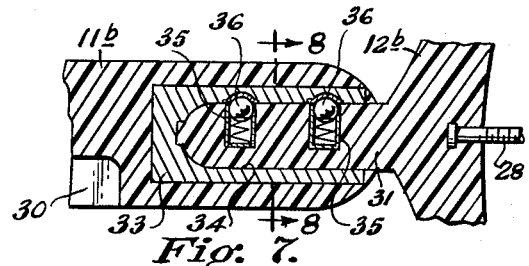
FIG. 7 is an enlarged, fragmentary sectional view showing the details of construction by which the saddle member is detachably connected to the buoyant member in the construction of FIG. 6.
Figure 8:
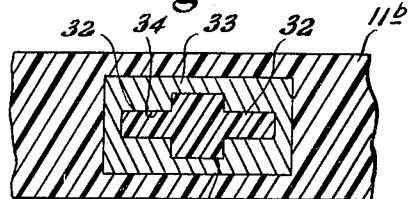
FIG. 8 is a transverse sectional view taken along the line 8—8 on FIG. 7.

It is further to be noted with reference to FIGS. 7 and 8 that the saddle member 12b is intended to be releasably attached to the buoyant member 11b at the back end of the latter so that, after use of the safety buoy and float 10b, the saddle member 12b can be removed from the back end of buoyant member 11b and compactly stowed in a recess 30 formed in one of the large surfaces of the buoyant member (FIGS. 6 and 7).

As shown on the drawings, the releasable attachment of the saddle member 12b to the back end of the buoyant member 11b may be obtained by providing the saddle member 12b with a stem 31 having laterally directed wings or flanges 32 at its opposite sides (FIG. 8), and by providing the buoyant member 11b with a socket 33 of relatively hard and rigid material embedded in the back end portion of the buoyant member. The socket 33 has a cavity 34 opening at the back end of the buoyant member 11b and formed with a cross-section corresponding to the cross-sectional shape of the stem 31 and lateral wings 32 of the saddle member 12b so that the stem 31 and wings 32 may be inserted axially in cavity 34 and held against turning in the latter by reason of the complementary, non-circular cross-sections (FIG. 8). In order to hold the saddle member 12b in its illustrated operative position with respect to the buoyant member 11b, the stem 31 is provided with bullet catches 35 (FIG. 7), each consisting of a ball urged by a related spring into a corresponding recess 36 at a suitable location in the surface of cavity 34.

It will be apparent that, when the safety buoy and float 10b is released by a swimmer, and thereby assumes a vertical position in the water with substantially the entire area of the buoyant member 11b projecting above the surface of the water, the saddle member 12b connected to the buoyant member as described above may be mounted or straddled from either side of the buoyant member by reason of the fact that such saddle member defines arcuate recesses 26b opening toward the buoyant member 11b at the opposite sides of the plane of the latter. When the swimmer lies against the buoyant member 11b so as to assume a prone position in the water, the buoyant member is slightly inclined with respect to the surface S, as shown in FIG. 6, so that the forwardly directed component of the buoyant force tends to maintain engagement of the saddle member 12b between the swimmer's legs, as previously described herein.

Referring now to FIGS. 9 and 10, it will be noted that the swimmer's safety buoy and float 10c there illustrated is generally similar to the previously described safety buoy and float 10b, with the exception that the saddle member 12c is intended to be stowed or nested in a recess 30c (FIG. 10) opening rearwardly at the back end edge of the buoyant member 11c. The central stem 31c of saddle member 12c may have a square cross-section, as is apparent on FIG. 12, and is received in the similarly shaped, rearwardly opening cavity 34c of the socket 33c embedded in the buoyant member and located centrally with respect to the recess 30c. It will be apparent that the stem 31c can be inserted in cavity 34c in the manner indicated on FIGS. 9, 10 and 11, in which case the saddle member 12c lies in a plane perpendicular to the plane of buoyant member 11c parallel to the large surfaces of the latter. When stem 31c is thus positioned in cavity 34c, the bullet catches 35c mounted in the stem are engageable with the recesses 36c provided in the top wall surface of the cavity, thereby to prevent inadvertent detachment of the saddle member from the buoyant member 11c. When the saddle member 12c is thus assembled with the buoyant member 11c, the safety buoy and float 10c is in its operative condition for use in the same manner as described above with reference to the device of FIG. 6. However, when the safety buoy and float 10c is to be transported or stored, the stem 31c of the saddle member is withdrawn from socket 33c and then reinserted following turning of the saddle member 12c about the axis of stem 31c through an angle of 90° from the position shown on FIGS. 9, 10 and 11. Such turning of the saddle member 12c brings the latter into the plane of the buoyant member 11c for registry with the recess 30c. It will be noted that the cavity 34c of socket 33c has a length at least as large as that of the stem 31c measured from the back edge of the saddle member. Thus, when the saddle member 12c has been turned so as to lie in the plane of buoyant member 11c, the stem 31c can be moved axially into cavity 34c to contact the end wall surface of the latter and thereby dispose the saddle member 12c in the recess 30c at the opposite sides of cavity 34c. In order to hold a saddle member 12c in its nested or stowed condition in recess 30c, a side wall surface of cavity 34c is provided with additional recesses 37 which are located for engagement by the bullet catches 35c when the saddle member is disposed in recess 30c.

When saddle member 12c is thus stowed in recess 30c at the back end of buoyant member 11c, the back edge surface of the saddle member lies flush with the adjacent portions of the back edge surface of the buoyant member, thereby providing a neat and compact assembly for easy transport and storage.

Referring now to FIGS. 13, 14 and 15, it will be seen that a swimmer's float 10d in accordance with a particularly advantageous embodiment of this invention has its saddle member 12d attached at the center of the back end of the buoyant member 11d in a manner to permit selective positioning of the saddle member at its operative position (FIG. 13), at a mounting position (FIG. 14) swung rearwardly and downwardly through approximately 90° from the operative position, and also preferably at a stowed position (FIG. 15), where the saddle member 12d lies in a plane parallel to the major plane of buoyant member 11d and is close against the back end of the latter.

It will be apparent that, when saddle member 12d is at its operative position (FIG. 13), it lies in a plane perpendicular to the major plane or large surface areas of buoyant member 11d and defines an arcuate recess opening generally toward the buoyant member at one side of, that is, above the latter. Thus, when a swimmer lies prone on the buoyant member 11d and straddles the saddle member 12d, the previously described tendency of the buoyant member to move forwardly out from under the swimmer is resisted by the engagement of saddle member 12d between the swimmer's legs, leaving the swimmer's arms and legs completely free for any desired movements, such as, those required in the crawl or other swimming stroke. As shown on FIG. 13, the buoyant member 11d preferably has a relatively narrow front portion which flares to a relatively wide back end portion. This preferred configuration of the buoyant member places additional buoyancy under the swimmer's waist or heaviest body portion and further avoids interference with downward movement of the swimmer's arms past the side edges of the relatively narrow front portion of the buoyant member.

When the saddle member 12d is at the described operative position, a swimmer may experience difficulty in mounting the same, particularly if the float 10c is arranged so that the buoyant member 11d thereof floats substantially horizontally on the surface of the water upon release from the swimmer. In order to facilitate mounting of the saddle member 12d by a swimmer, the saddle member is attached to buoyant member 11d by a mechanism 37 (FIG. 16) permitting swinging of saddle member 12d rearwardly and downwardly through approximately 90° from the operative position of FIG. 13 to the mounting position of FIG. 14. When at the mounting position, the arcuate recess defined by saddle member 12d opens upwardly and the saddle member is disposed below the plane of the top surface of buoyant member 11d so that a swimmer can easily float onto the latter without interference from the saddle member.

As shown on FIG. 16, the mechanism 37 includes an elongated housing 38 extending longitudinally in the back end portion of member 11d and being embedded or otherwise secured in the latter. Housing 38 has a bore 39 of square cross-section opening at the center of the back end of buoyant member 11d and receiving a mounting rod 40. The rod 40 includes an outer portion 41 of square cross-section matching that of the bore 39 so as to be only longitudinally slidable in the latter, and an inner portion 42 of circular cross-section having circumferential grooves 43 and 44 respectively located adjacent square portion 41 and at a location spaced axially therefrom. The outer end of rod 40 carries a pin 45 extending thereacross, and the saddle member 12d has a pair of spaced apart lugs 46 at one end, which lugs are pivoted on pin 45 at the opposite sides of rod 40.

The lugs 46 have cam surfaces 47 formed thereon for engagement with the back end surface of housing 38, and a tension spring 48 is connected between an ear 49 at the inner end of rod 40 and an anchor pin 50 turnable in the inner or forward end of housing 38 so as to urge rod 40 forwardly or into bore 39 and thereby maintain engagement of cam surfaces 47 with the back end of the housing. The cam surfaces 47 are shaped so that rearward and downward swinging of saddle member 12d, from its operative position shown on FIGS. 13 and 16 to its mounting position shown on FIG. 14, causes rearward movement of pivot pin 45 and hence of rod 40 against the action of spring 48.

If desired, the cam surfaces 47 may be formed with flat portions engaging the back end of housing 38 in both the operative and mounting positions of the saddle member 12d, thereby to cooperate with spring 48 in yieldably holding the saddle member in either of said positions. However, in the illustrated embodiment, the cam surfaces 47 have flat portions engaging the end of housing 38 only in the operative position of the saddle member, and the mechanism 37 is preferably provided with a latch 51 slidable transversely in a lateral extension 52 of housing 38 and being operative to releasably lock rod 40 in the positions thereof corresponding to the operative and mounting positions of the saddle member. As shown, latch 51 has a keyhole-shaped opening 53 (FIGS. 16 and 17) through which the rod 40 extends. The opening 53 is dimensioned so that only the groove 43 or 44 of rod 40 is engageable in the relatively small slot portion of opening 53, while the circular cross-section of portion 42 can only pass through the large diameter portion at the right-hand end of opening 53, as viewed in FIGS. 16 and 17. As shown on FIG. 17, a spring 54 urges the latch 51 toward the right, as there viewed. An actuating rod 55 extends from latch 51 and terminates in a button 56 (FIG. 16) which is exposed at the side of buoyant member 11d (FIGS. 13, 14 and 15). Thus, spring 54 normally urges latch 51 to the illustrated position where keyhole opening 53 receives either groove 43, to retain the saddle member in its operative position, as shown on FIG. 16, or groove 44 to retain the saddle member in its mounting position. However, when button 56 is depressed to shift latch 51 toward the left, as viewed on FIGS. 16 and 17, the portion 42 of rod 40 can slide through the circular portion of opening 53 and thereby permit movement of saddle member 12d between its operative and mounting positions.

In the illustrated embodiment, the cam surfaces 47 are shaped so that the force of spring 48 automatically causes return of the saddle member from its mounting position to its operative position upon release of latch 51, as described above.

As shown on FIG. 16, the saddle member 12d may be provided with a weight 27d which is removably attached thereto, as by screws 28d, and is sufficient to cause the buoyant member 11d to float in a substantially upright position, thereby to constitute a safety buoy, particularly when the saddle member is moved to its mounting position for spacing the weight from the back end of member 11d. However, with the weight 27d removed, the float 10d will normally assume a substantially horizontal position.

The square portion 41 of rod 40 is axially dimensioned so that, when the rod 40 is pulled rearwardly by movement of saddle member 12d to its mounting position, square portion 41 is completely withdrawn from square bore 39 thereby permitting turning of saddle member 12d about the axis of rod 40 into a plane parallel to the major plane of buoyant member 11d. Thereafter, release of latch 51 will permit spring 48 to swing saddle member 12d to its stowed position (FIG. 15) against the back end of member 11d which is shaped to conform to the curvature of the saddle member. When the saddle member is in such stowed position, the float 10d can be easily transported or stored.

It will further be appreciated that the housing 38 of mechanism 37, rather than being permanently embedded or retained in member 11d, may be insertable in a socket opening at the back end of the latter, for example, similar to the socket 33c of the float 10c of FIG. 10. In that case, the housing 37 may be longitudinally adjustable in the socket to vary the position of the saddle member relative to the buoyant member for accommodating swimmers of different sizes.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention, except as defined in the appended claims.

What is claimed is:

1. A swimmer's float comprising a substantially flat buoyant member having large surface areas at the opposite sides thereof; and a saddle member extending from the center of one end of said buoyant member and held in an operative position lying in a plane perpendicular to the planes of said large surface areas, said saddle member defining at least one arcuate recess which, when said saddle member is in said operative position, opens generally toward said buoyant member at one of said sides of the latter so that a swimmer can straddle said saddle member at said recess and thereby be maintained in engagement with the float while lying on said buoyant member and being supported by the latter, said saddle member being non-buoyant and thereby causing said buoyant member to float in an erect position with said one end lowermost and with major portions of said surface areas out of the water upon release of the float from a swimmer, so that the float then also constitutes a readily visible safety buoy.

2. A swimmer's float as in claim 1;
further comprising a line extending from said one end of the buoyant member and being connectable to an underwater swimmer so that the erect buoyant member will constitute a marker for warning surface craft of the presence of the swimmer.

3. A swimmer's float as in claim 2;
further comprising a reel in the buoyant member connected to said line and operative to rewind the latter upon the return of the swimmer to the surface, thereby to ensure that the swimmer will surface near the float.

4. A swimmer's float as in claim 1;
wherein said buoyant member is of expanded plastic material so as to be small weight in relation to its volume.

5. A swimmer's float as in claim 1; wherein said saddle member defines two recesses opening generally toward said buoyant member at the opposite sides of the latter so that a swimmer can mount said saddle member from each of said opposite sides of the buoyant member.

6. A swimmer's float as in claim 1;
wherein said saddle member has its center of gravity spaced substantially from said one end of the buoyant member and lying substantially in the plane of symmetry of the buoyant member parallel to said large surface areas of the latter.

7. A swimmer's float as in claim 1;
further comprising weighting means mounted on said saddle member to increase the tendency of the latter to cause said buoyant member to float in said erect position.

8. A swimmer's float as in claim 7;
wherein said weighting means extends from said saddle member in the direction away from said buoyant member.

9. A swimmer's float comprising a substantially flat buoyant member having large surface areas at the opposite sides thereof; a saddle member extending from the center of one end of said buoyant member and held in an operative position lying in a plane perpendicular to the planes of said large surface areas, said saddle member defining at least one arcuate recess which, when said saddle member is in said operative position, opens generally toward said buoyant member at one of said sides of the latter so that a swimmer can straddle said saddle member at said recess and thereby be maintained in engagement with the float while lying on said buoyant member and being supported by the latter;

means detachably connecting said saddle member with said buoyant member; and wherein said buoyant member has a recess therein adapted to have said saddle member stowed therein upon detachment of the latter from said buoyant member.

10. A swimmer's float as in claim 9;

wherein said recess is in one of said large surface areas of the buoyant member.

11. A swimmer's float comprising a substantially flat buoyant member having large surface areas at the opposite sides thereof; a saddle member extending from the center of one end of said buoyant member and held in an operative position lying in a plane perpendicular to the planes of said large surface areas, said saddle member defining at least one arcuate recess which, when said saddle member is in said operative position, opens generally toward said buoyant member at one of said sides of the latter so that a swimmer can straddle said saddle member at said recess and thereby be maintained in engagement with the float while lying on said buoyant member and being supported by the latter;

said buoyant member having a socket opening at the center of said one end, and a recess in said one end at opposite sides of said socket; and said saddle member having a stem insertable in said socket to dispose said saddle member in said operative position lying in said plane perpendicular to the planes of said large surface areas and, alternatively, to dispose said saddle member parallel to said planes of the large surface areas for reception of said saddle member in said recess at said one end of the buoyant member.

12. A swimmer's float as in claim 11;

further comprising means for releasably retaining said stem in said socket with said saddle member perpendicular and parallel, respectively, to said large surface areas.

13. A swimmer's float comprising a substantially flat buoyant member having large surface areas at the opposite sides thereof; a saddle member extending from the center of one end of said buoyant member and held in an operative position lying in a plane perpendicular to the planes of said large surface areas, said saddle member defining at least one arcuate recess which, when said saddle member is in said operative position, opens generally toward said buoyant member at one of said sides of the latter so that a swimmer can straddle said saddle member at said recess and thereby be maintained in engagement with the float while lying on said buoyant member and being supported by the latter; and means mounting said saddle member on said buoyant member for swinging movement from said operative position to a mounting position where said saddle member is disposed at the other of said sides of the buoyant member and said arcuate recess opens toward said one side, thereby to facilitate the mounting of said one side of the buoyant member by a swimmer.

14. A swimmer's float as in claim 13; wherein said means mounting the saddle member on the buoyant member further permits swinging of said saddle member about the longitudinal axis of the buoyant member to a stowed position lying against the back end of the latter in a plane parallel to said planes of the large surfaces.

15. A swimmer's float as in claim 14; further comprising latch means operative to selectively retain said saddle member in said operative, mounting and stowed positions.

16. A swimmer's float as in claim 13; further comprising a weight detachably connected to said saddle member to cause said buoyant member to float in an erect position with said one end lowermost upon release of the float from a swimmer with said saddle member in its mounting position.

17. A swimmer's float as in claim 13; wherein said means mounting the saddle member on said buoyant member includes a housing in said buoyant member defining a longitudinal bore opening at the center of said one end of the buoyant member, a rod slidable axially in said bore and projecting from the latter, pivot means carried by the projecting end of said rod and having one end of said saddle member mounted thereon for swinging of the latter about an axis perpendicular to the axis of said rod, spring means urging said rod into said bore, and cam surfaces on said one end of the saddle member held in engagement with said housing by the force of said spring means and having flat portions engaging said housing at least when said saddle member is in said operative position, thereby to yieldably hold the saddle member thereat.

18. A swimmer's float as in claim 17; wherein said cam surfaces are shaped to move said rod in the direction out of said bore against the action of said spring means in response to swinging of said saddle member from said operative position to said mounting position, said bore is of square cross-section, and said rod has an outer end portion of square cross-section normally engaging in said bore to prevent turning of said rod about its longitudinal axis, said outer end portion of the rod being withdrawn from said bore upon swinging of said saddle member to said mounting position, whereupon said rod is free to turn about its axis and reengage its outer end prtion in the bore upon disposal of the saddle member in a stowed position lying against the back end of said buoyant member in a plane parallel to said planes of the large surfaces.

19. A swimmer's float as in claim 18; further comprising a latch member movable laterally relative to said rod, and grooves spaced along said rod so as to be selectively engageable by said latch member when said saddle member is in said operative and stowed positions and in said mounting position, respectively, thereby to hold the saddle member against movement away from the selected position.

20. A swimmer's float as in claim 19; further comprising means yieldably urging said latch member in one lateral direction into engagement with said rod, and manually actuable means extending from said latch member and projecting at the outside of said buoyant member for moving said latch member out of engagement with said rod and thereby permitting a change in the position of said saddle member.

References Cited by the Examiner

UNITED STATES PATENTS

| | | | |
|---|---|---|---|
| 1,552,298 | 9/25 | Harootunian | 9—311 |
| 1,712,620 | 5/29 | Johnson | 115—70 |
| 2,712,139 | 7/55 | Kelly | 9—310 |
| 3,123,845 | 3/64 | Girden | 9—311 |

FERGUS S. MIDDLETON, *Primary Examiner.*